(12) United States Patent
Holmes et al.

(10) Patent No.: US 6,449,304 B1
(45) Date of Patent: Sep. 10, 2002

(54) METHOD OF DETERMINING THE CARRIER REFERENCE PHASE OF COHERENT DEMODULATION OF FREQUENCY HOPPED CONTINUOUS PHASE MODULATED SIGNALS WITH SYNCH WORDS ARBITRARILY LOCATED WITHIN THE HOP

(75) Inventors: Jack K. Holmes, Los Angeles; Gee L. Lui, Westminster; Chit-Sang Tsang, San Gabriel, all of CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 09/312,729

(22) Filed: May 14, 1999

(51) Int. Cl.$^7$ ................................................ H04B 1/713

(52) U.S. Cl. ........................ 375/133; 375/135; 375/136

(58) Field of Search ................................ 375/132, 133, 375/135, 136, 274, 279, 305, 308, 329, 336; 329/300, 304; 332/100, 103

(56) References Cited

U.S. PATENT DOCUMENTS

| | | | | |
|---|---|---|---|---|
| 4,607,375 A | * | 8/1986 | Lee ............................... | 380/32 |
| 5,151,925 A | * | 9/1992 | Gelin et al. .................. | 375/328 |
| 5,341,396 A | * | 8/1994 | Higgins et al. .............. | 375/130 |
| 5,574,750 A | * | 11/1996 | Peponides et al. .......... | 375/224 |
| 6,005,856 A | * | 12/1999 | Jensen et al. ................ | 370/337 |
| 6,317,412 B1 | * | 11/2001 | Natali et al. ................. | 370/208 |

* cited by examiner

Primary Examiner—Young T. Tse
(74) Attorney, Agent, or Firm—Derrick Michael Reid

(57) ABSTRACT

Unambiguous carrier phase estimation for frequency hop signals of a frequency hopping Gaussian minimum shift keying (GMSK) communication system using coherent demodulation is enabled by channel zeroing bits and channel guard bits positioned between each pair a preceding data portion and a succeeding synch word, functioning as cumulative data phase zero forcing bits that force the accumulative data phase to zero at the end of the synch word for determining the carrier phase for subsequent data demodulation so that each synch word may be arbitrarily placed within a hop of the hopping signal having an unknown carrier phase for improved interference immunity.

13 Claims, 3 Drawing Sheets

GMSK SIGNALLING METHOD

FREQUENCY HOPPING GMSK RECEIVER

FREQUENCY HOP SIGNAL

GMSK PULSE AND PHASE RESPONSES

GMSK SIGNALLING METHOD

FREQUENCY HOPPING GMSK RECEIVER

METHOD OF DETERMINING THE CARRIER REFERENCE PHASE OF COHERENT DEMODULATION OF FREQUENCY HOPPED CONTINUOUS PHASE MODULATED SIGNALS WITH SYNCH WORDS ARBITRARILY LOCATED WITHIN THE HOP

STATEMENT OF GOVERNMENT INTEREST

The invention was made with Government support under contract No. F04701-93-C-0094 by the Department of the Air Force. The Government has certain rights in the invention.

FIELD OF THE INVENTION

The invention relates to the field of communication systems. More particularly the present invention relates to carrier phase determination in frequency hopped communication systems.

BACKGROUND OF THE INVENTION

Communication systems communicate signals using a variety of possible spectrum spreading and modulation methods. One such spread spectrum method is frequency hopping where a data signal modulates the hopped carrier signal that hops between a prescribed set of different carrier frequencies. One such data modulation method is a Gaussian minimum shift keying (GMSK). GMSK is a form of continuous phase modulation (CPM) that exhibits a very narrow spectral occupancy and a constant envelope, thus making it compatible with non-linear power amplifier operation without the concomitant spectral re-growth associated with non-constant envelope signals. These attributes render GMSK an attractive data modulation scheme in all high throughput Frequency Division Multiple Access (FDMA) satellite communication systems where only limited system bandwidth is available.

A GMSK signal is formed with a formatted data signal, such as a NRZ data stream of a series of data bits (each having a duration of T seconds) and passed through a Gaussian filter with bandwidth B Hz and an FM modulator usually with modulation index of 0.5. A GMSK signal can also be generated by passing the formatted data bit stream through the Gaussian filter and then through an integrator and then into a phase modulator. This method is an alternative and equivalent method of generating GMSK signals. The output of the Gaussian filter is a series of Gaussian filter pulse responses to the respective data bits of the input data stream that are passed through the frequency modulator usually having the 0.5 modulation index that frequency modulates the carrier signal. The response of the Gaussian filter to an input data bit typically extends over a predetermined number of bit periods creating overlapping superimposed component signal from a respective number of predetermined data bits. Hence, each of the resulting respective predetermined number of prior data Gaussian filter pulse responses contribute a signal component for modulating the carrier phase of the frequency modulated signal. As such, the continuous output of the FM modulator, at each bit time, depends upon a predetermined number of prior data bits, inputted into the Gaussian filter, and hence the Gaussian filter and FM modulator have memory represented by these overlapping superimposed signal components from the prior predetermined number of data bits. This memory over L prior data bit is known as intersymbol interference where the carrier phase during the present bit time depends on the bit pattern previous to that bit for a predetermined number of data bits. This memory length depends upon the Gaussian filter bandwidth bit period BT product. In typical implementations, the NRZ data stream is a series of bits that can be represented by data pulses having +/−1V voltage levels. Each +1V or −1V data pulse of a respective data bit contributes to a phase response that is accumulated over time within a frequency hop. The Gaussian filter provides pulse responses to the +1V or −1V data pulses that are accumulated in the FM modulator. Each of the pulse responses are integrated in the FM modulator to provide a phase shift of $\pm\pi/2$ at steady state. The FM modulator output provides a modulo $2\pi$ rendering of the accumulated phase response of all of the past $\pm\pi/2$ data bits from the start of the frequency hop. The FM modulator output, at anytime within the hop, contains an accumulated phase response based on all the previous bits from the start of the hop. The resulting modulo $\pi/2$ phase response is hence a continuous accumulated phase output reduced modulo $2\pi$ as a function of all the prior data bits from the start of the hop.

The GMSK phase modulated signal transmitted by the GMSK transmitter arrives at an arbitrarily time at the GMSK receiver. The GMSK receiver generates a local carrier reference for coherent demodulation of the received GMSK signal. When a GMSK signal arrives arbitrarily in time at the receiver, there is a carrier phase difference between the received carrier signal and the locally generated carrier reference. The carrier phase is initially unknown due to the unknown propagation time between the transmitter and the receiver. Thus, the GMSK signal has a changing phase due to data modulation and a constant (but unknown) carrier phase due to unknown propagation time. Upon reception of the GMSK phase modulated carrier signal, the carrier phase must be firstly determined for demodulating the GMSK signal so that the resulting accumulative phase can be determined to then enable the reconstruction of the data stream at the receiver.

Hence, determining the carrier phase is essential in coherent communications so that the carrier phase modulated by the data stream can be determined to recover the data. It is desirable to determined the carrier phase rapidly and reliably for improved system performance. The carrier phase of a GMSK modulated frequency hopped signal or an on-off GMSK modulated frequency hopped signal must be estimated with the use of one or more synch words embedded in the data stream in each frequency hop. The synch word is placed at the beginning of the hop followed by data, and the synch word is known to the receiver so that the accumulative phase of the synch word is also known, so that the carrier phase can be determined at the beginning of the hop. Hence, when the synch word is at the beginning of the hop, there is no carrier phase ambiguity because the resulting carrier phase of the signal is due to the original carrier phase and the expected accumulated phase due to the modulation sequence used in the known synch word. This method of determining of the carrier phase requires that the known synch word be placed at the beginning of the hop follow by data. When the synch word is located at the start of a hop there is a vulnerability to synch word jamming preventing reliable reception and demodulation of the GMSK signal.

The current received signal phase is the sum of a carrier phase and the accumulated data phase of the previous data channel bits. The pulse response from the Gaussian filter extends over 1/(BT) bit periods represented as an integer for denoting the intersymbol interference memory length. For GMSK signals with a memory of L channel bits, the preceding L−1 channel bits will establish the current data phase. If the prior L−1 channel bits were known and communicated in advance of the synch word, it is possible to determine the carrier phase at the beginning of the hop from the known prior data bits inducing expected data phase changes prior to the synch word. However, true unknown data is not known a priori. Hence, if the synch word or words of known data bits are placed at any other location within the hop beyond the start of the hop, the current phase at the receiver will be affected by both the unknown carrier phase and the unknown data phase resulting from the channel bits prior to the synch word. When the synch word is not placed at the beginning of the hop so that random data precedes the synch word, both carrier phase and data phase are unknown, and the carrier phase becomes ambiguous, prohibiting carrier phase determination and thereby prohibiting data demodulation. It thus appears that the synch word cannot be placed anywhere other than at the beginning of the hop. Hence, prior GMSK frequency hop signaling methods do not enable coherent demodulation of random channel data bits at the beginning of the hop prior to the first synch word. Interference can corrupt the reception of signals, and when interference affects the synch word at the beginning of a hop, the entire hop data will not be recovered. Hence, it is desirable to place the synch word or words arbitrarily within a hop, and still demodulate the channel bits. These and other disadvantages are solved or reduced using the present invention.

SUMMARY OF THE INVENTION

An object of the invention is to provide a method for determining the carrier phase (of the hopped carrier) modulo $2\pi$ of Gaussian minimum shift keyed (GMSK) frequency hopped signal having a synch word arbitrarily positioned within a frequency hop.

Another object of the invention is to demodulate first and second data portions of a frequency hop having a synch word arbitrarily placed between the first and second data portions within a frequency hop signal.

A further object of the invention is to demodulate first, second, and third data portions of a frequency hop having a first synch word position between the first and second data portions, and having a second synch word positioned between the second and third data portion all within a frequency hop.

Another object of the invention is to demodulate a plurality of data portions of a frequency hop signal having a synch word between each pair of consecutive portions of the plurality of data portions all within a frequency hop.

Yet another object of the invention is to demodulate first and second random data portions by determining the unknown carrier phase of the carrier signal which has a known synch word and zeroing and guard bits arbitrarily placed between the first and second data portions with the zeroing and guard bits located just prior to the synch word, and contiguous to it, to generate a known data phase for determining the carrier phase for demodulating the second data portion and then demodulating the first data portion.

The invention is directed to a GMSK data modulated frequency hopped communication method using zeroing channel bits and channel guard bits just prior to a known synch word arbitrarily placed between the first and second data portions of a frequency hop for estimating the carrier phase of the frequency hopped signals. A frequency hopped communication system includes a transmitter transmitting GMSK frequency hopped signals and a receiver processing the GMSK frequency hopped signals. The transmitter generates GMSK continuous phase signals. The receiver demodulates the GMSK frequency hopped signals using coherent demodulation by estimating the phase of the carrier on each hop. The carrier phase is constant over a frequency hop. The transmitter inserts the zeroing channel bits and channel guard bits during transmission of each frequency hop, and the receiver detects the zeroing channel bits and channel guard bits for determining the carrier phase which is needed to demodulate each frequency hop. The synch words are positioned arbitrarily within each hop. The zeroing channel bits and channel guard bits are located just prior to the synch word and are used to establish zero cumulative phase modulo $2\pi$ due to the first data position that is located in advance of the synch word so that the carrier phase can be determined by subtracting the synch word induced phase from the phase estimated at the end of the synch word. Once the carrier phase is known, the second data portion of the frequency hop can then be demodulated, and during a second demodulation pass, the first data portion can then be demodulated.

One zeroing phase channel bit is used for on-off keying GMSK (OOKGMSK) frequency hopped signals. Two zeroing phase channel tri-bits are used for GMSK frequency hopped signals. The zeroing tri-bits that are used for GMSK are defined as binary ones, binary zeros and true zeros. The carrier phase can increase by $\pi/2$ radians for a binary one, decrease by $\pi/2$ radians for a binary zero, or not change for a true zero. In other words, three states must be available for the zeroing bits for GMSK frequency hopped signal. However, only the usual two bits, binary zero and binary one, are needed for the OOKGMSK frequency hopped signal. In either case, L−1 channel guard bits are used in the frequency hopped signals where L=1/BT and is the Gaussian filter intersymbol interference memory of the GMSK modulation, where B is the 3 dB bandwidth of the GMSK Gaussian filter, and where T is the channel bit duration. Preferably, the L−1 guard channel bits are all true zero bits.

The communication method requires for the OOKGMSK frequency hopped signal one zeroing bit plus L−1 overhead guard bits where L is the filter memory of the GMSK signal corresponding to channel bit periods. For the GMSK frequency hopped signal, two tri-bit zeroing bits are needed plus L−1 guard bits that are true zero. Synch word, or words, may be placed anywhere in a GMSK modulated hop as long as the zeroing bits are L−1 channel guard bits are located just prior to the synch word or words. The carrier phase for coherent demodulation can be unambiguously estimated and the data can then thereafter be demodulated. The zeroing bit and guard bits establish a known data phase at the beginning of each synch word so that the carrier phase can be determined for demodulating the data portions of the hop for reconstructing the estimate of the transmitted data at the receiver. These and other advantages will become more apparent from the following detailed description of the preferred embodiment.

DETAILED DESCRIPTION OF THE PREFERRED EMBODIMENT

Figure 1:
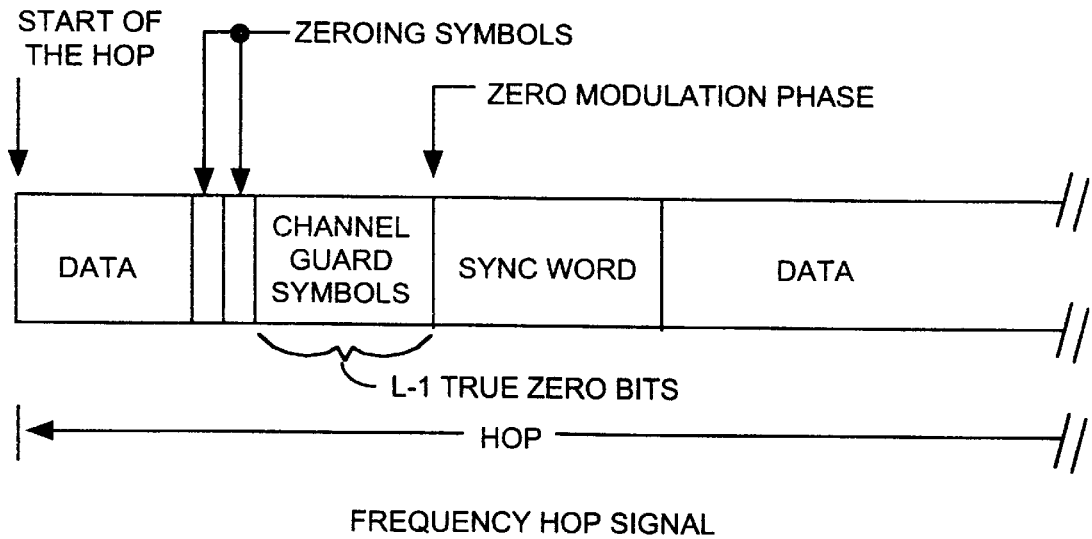
FIG. 1 is a diagram of a data stream of a frequency hopping signal.
Figure 2:
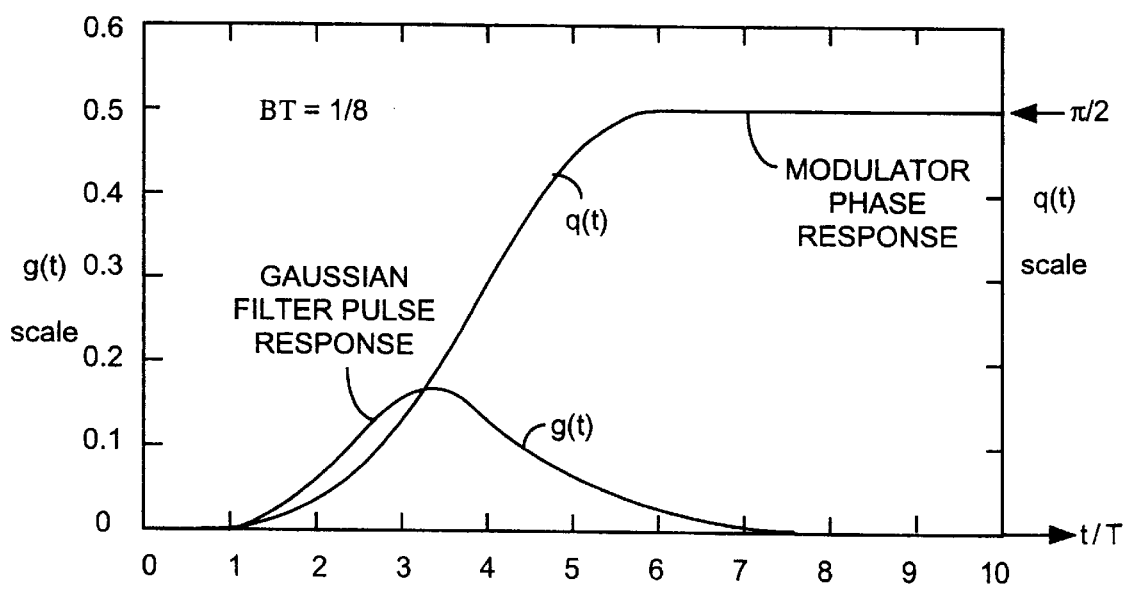
FIG. 2 shows a graph depicting a frequency symbol and a phase symbol as a function of time for a Gaussian filter having a bandwidth bit period product BT equal to ⅛.

An embodiment of the invention is described with reference to the figures. Referring to all of the Figures, a frequency hopping signal of a respective frequency hop of a frequency hopping GMSK communication system is comprised of a beginning first data portion, an ending second data portion, a synch word arbitrarily positioned within the frequency hop and between the two data portions, channel guard symbols positioned just before the synch word, and zeroing symbols positioned just before the channel guard symbols all located on one hop.

A data source provides a data stream d(n) that is formatted by a formatter providing NRZ data pulses d(t). In the preferred formatter, the data pulses d(t) assume voltage levels from a symbol set of either +1 volts or −1 volts. The data pulses d(t) representing respective pulse symbols p(t) equaling one during the time zero to T seconds and otherwise equaling zero. The data rate R is equal to the inverse of the bit period T. The data stream d(t) is composed of the sum of M data pulses indexed by i within the data symbol set. The series of +1V and −1V data pulses d(t) corresponds to a series of zero and one data bits, that is a series of zero and one symbols for the preferred formatter.

The data stream d(t) is communicated to a Gaussian filter providing respective Gaussian filter pulse responses g(t). The pulse responses g(t) are communicated to an integrator providing accumulated phase responses q(t) that are translated by the phase modulator into accumulative carrier phase modulation. The Gaussian filter is defined by a 3 db bandwidth B. The bandwidth bit-time product is BT. The filter pulse responses g(t), in the time domain, extend over L bit time periods T, for example, eight bit time periods for a BT product of ⅛, representing intersymbol interference. Hence, the Gaussian filter pulse responses g(t) is at any time an accumulation of pulse responses over the memory period L symbols.

Both positive and negative pulse responses g(t) are provided for respective positive and negative data bits in d(t) for GMSK. For OOKGMSK, the Gaussian filter pulse responses g(t) and the resulting respective phase responses q(t) are either zero or twice as large than the filter pulse response g(t) and phase response g(t) for GMSK. Thus, for OOKGMSK, the phase response q(t) will settle to π radians or zero radians with a binary zero producing π radians change and a binary one producing zero radians change.

The filter pulse responses q(t) for positive data pulses and negative data pulses are respectively preferably translated into positive and negative π/2 phase responses q(t) for GMSK and a zero phase change or a π phase changer for OOKGMSK. The phase modulator is defined by a modulation index h and the phase modulator modulates the frequency hop carrier signal by the accumulated phase response q(t) from the integrator. The modulation index h translates cumulative phase responses q(t) into the cumulative phase modulation Ψ(t). The phase modulation index h for all continuous pulse modulated (CPM) systems is equal to 2k/q', where k and q' are relatively prime in that the largest common factor is one, and q' is the number of phase states modulo 2π and is not the same as q(t). In the preferred form, the modulation index h equals ½ for four phase states modulo 2π for GMSK. Hence, the data pulses d(t) are filtered and integrated into an accumulated carrier phase Ψ(t) having a steady state value of zero, π/2, π or 3π/2. The cumulative phase response q(t) is input to the phase modulator for phase modulating the frequency hopped carrier signal having a frequency $\omega_C(t)$ by the amount of the accumulative data phase Ψ(t) into a transmitted GMSK frequency hopped signal S(t). The frequency hopped signal S(t) is a function of the transbit bit energy Ecb, and the carrier hopping frequency $\omega_C(t)$, the accumulated phase ϕ(t).

In the preferred form, the modulation index h equals one for two phase states modulo 2π for OOKGMSK signaling. The frequency hop signal S(t) will arrive at the receiver arbitrarily in time creating an unknown carrier phase $\theta_C$ at the receiver. The receiver can estimate the received carrier phase. For the receiver to demodulate the received signal, the carrier phase must be estimated. After the carrier phase is determined, the receiver can demodulate the received data portions and thereby reconstruct the data stream.

When the synch word is positioned between the first and second data portions within the frequency hop, zeroing symbols and guard symbols are inserted just prior to the synch word. The channel guard symbols and zeroing symbols along with the synch word, are used for obtaining the carrier phase of the frequency hopped signal which may be a GMSK frequency hopped signal or an OOKGMSK frequency hopped signal, in both of which the synch word is arbitrarily placed within the hop time boundaries between the two data portions with the zeroing and channel guard symbols immediately proceeding the synch word. Carrier phase is determined after the reception of the synch word, after which both the first and the second data portions can be coherently demodulated. Commonly, after demodulating the second data portion, the first data portion which had been stored, would be coherently demodulated thus requiring a second demodulation pass on the received signal.

A set of zeroing bits followed by a set of L−1 guard bits are inserted within the hop just prior to the synch word and after the first data portion. The accumulated phase at the end of the first data portion will be forced to zero at the end of the channel guard bits. The zeroing bits are inserted just prior to the predetermined channel guard bits to force to zero the cumulative data phase in steady state. The L−1 channel guard bits allow the transient to converge to zero radians at a steady state at the end of the guard bits. The set of L−1 channel data bits which are all true zero bits, is placed just prior to the synch word to allow the cumulative data phase to settle to zero phase modulo 2π after the L−1 channel bits. Thus, the phase of the carrier within the synch word duration is guaranteed to be zero radians modulo 2π. Because the L−1 channel bits are all true zero bits, the resulting phase change attributed to the channel bits plus the zeroing bits will be zero modulo 2π at the start of the synch bits. Therefore, the carrier phase can be determined at the end of the synch word duration.

For a GMSK signal with modulation index h of ½, a set consisting of two channel tri-bits is needed to make the cumulative phase sum to zero modulo 2π. As another example, if the cumulative phase at the transmitter at the end of the first data portion is π radians due to the data prior to the synch word, then either a pattern of "11" or "00" can be transmitted just after the data to make the cumulative transmitted phase zero modulo 2π. Only two tri-bits are needed because two tri-bits can change the cumulative phase by at most π radians which is always enough to force to zero modulo 2π the accumulated phase for a four phase GMSK signal with a modulation index h of ½. For OOKGMSK signaling, only one zeroing bit is needed, and tri-bits are not needed in OOKGMSK signaling and only one binary one or zero bit is needed to force the cumulative phase to zero modulo $2\pi$, as OOKGMSK only takes on the phase values of zero or $\pi$ modulo $2\pi$. With the phase at the start of the synch word forced to zero, the synch word provides an estimate of the carrier phase because the phase contribution has by design settled to zero modulo $2\pi$ at the start of the synch word. This carrier phase determination is then used to demodulate the second data portion. The receiver must have memory to store the time line representation of the received signal during the first data portion so that the first data portion can be demodulated during the second demodulation pass using the estimated carrier phase determined from the synch word. The synch word and the associated zeroing bits and channel guard bits could be randomly place within the hop to protect against synch jamming.

Figure 3:
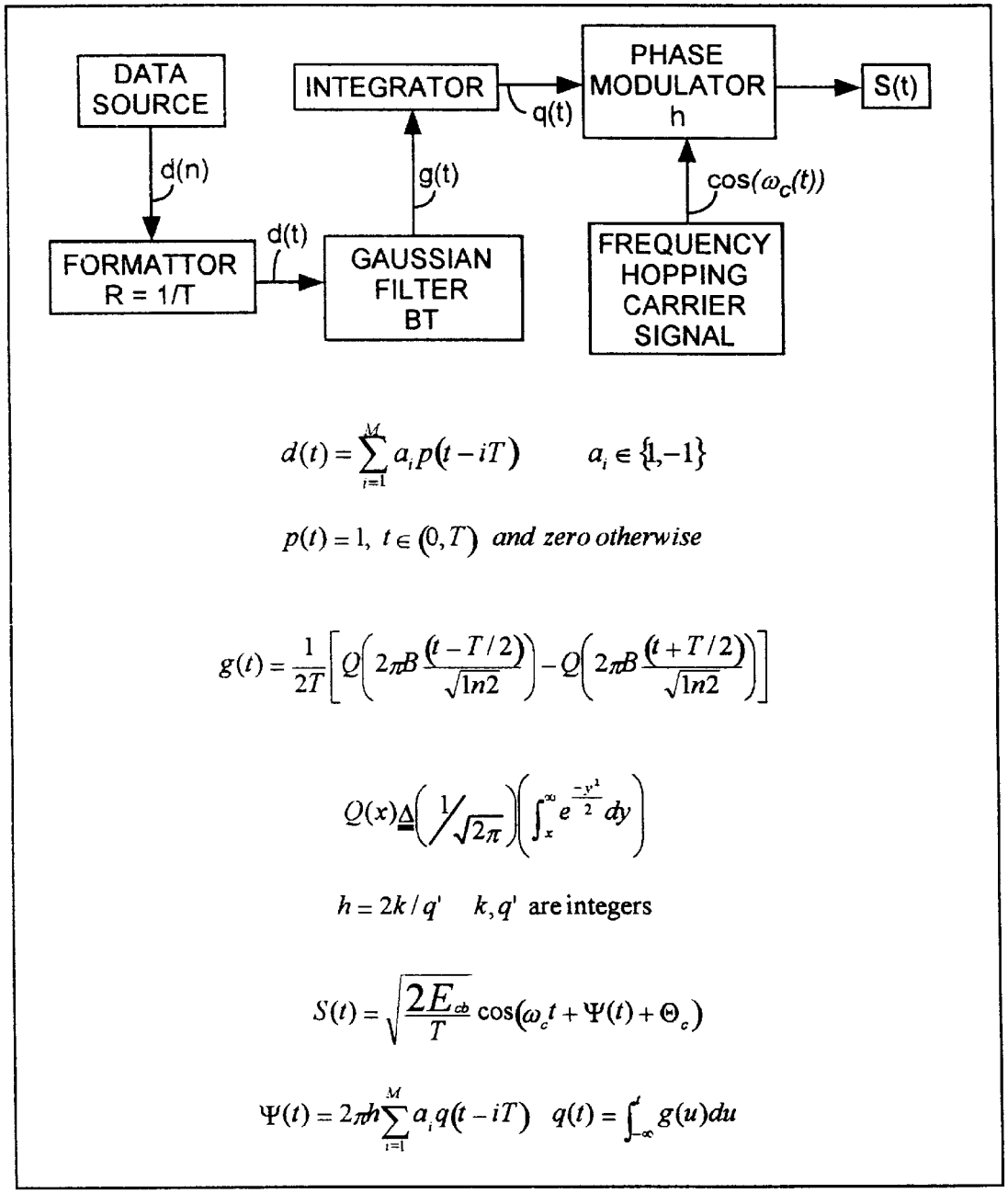
FIG. 3 is a block diagram of a GMSK frequency hopping transmitter and a pictorial representation of the GMSK signaling method including relevant equations describing the operation of a GMSK modulated communication system.
Figure 4:
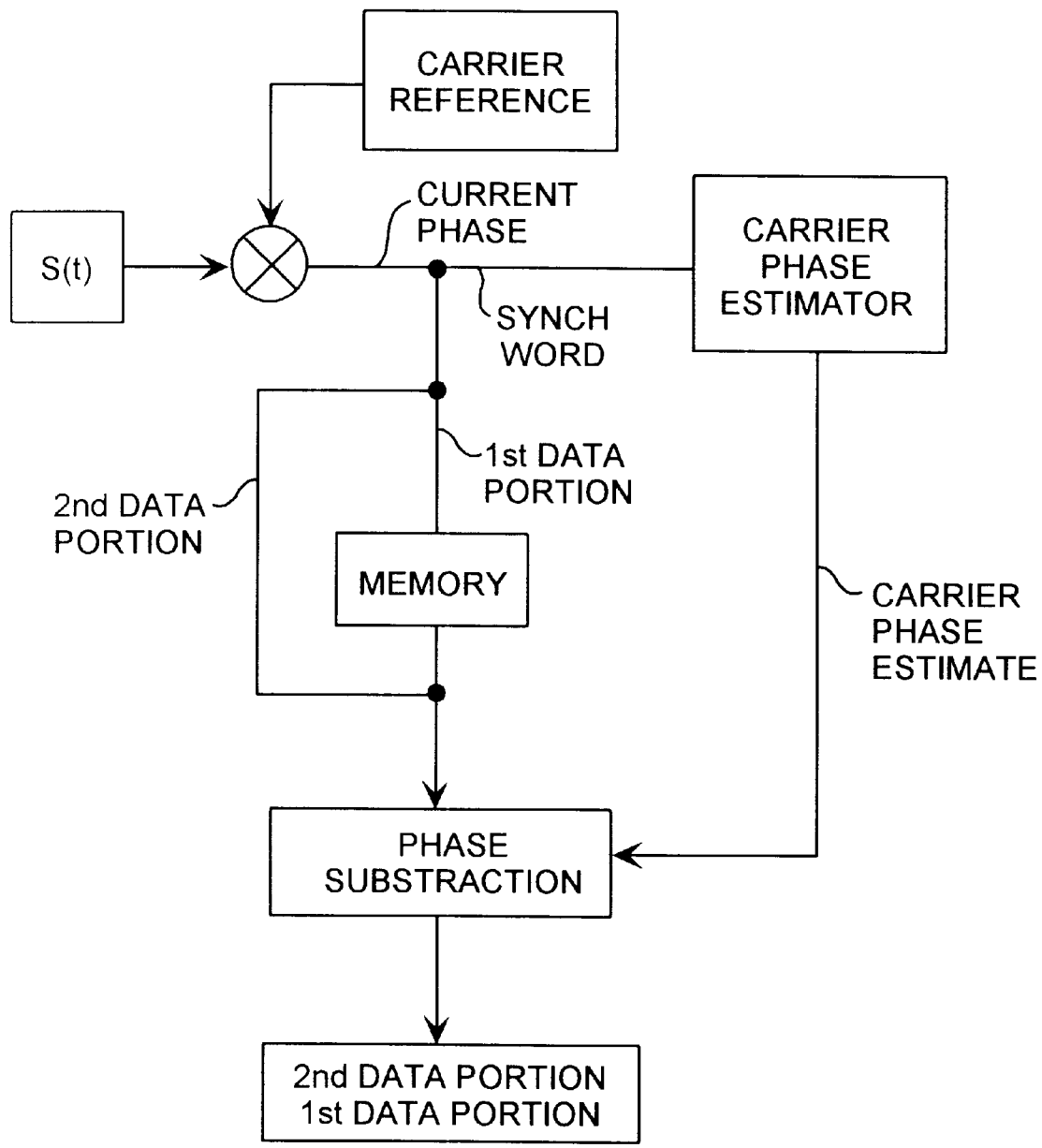
FIG. 4 is a block diagram of a GMSK frequency hopping receiver.

The frequency hopped communication system includes a transmitter, shown in FIG. 3 transmitting GMSK frequency hopped signals and a receiver, shown in FIG. 4, for processing the GMSK frequency hopped signals. The transmitter generates GMSK continuous phase signals. The receiver demodulates the GMSK frequency hopped signals using coherent demodulation by estimating the phase of the carrier on each hop. The received GMSK signal S(t) is received by a GMSK frequency hopping receiver. The received GMSK signal has a changing phase due to data modulation and a constant, but unknown, carrier phase due to unknown propagation time. Upon reception of the GMSK phase modulated carrier signal, the carrier phase is firstly determined for demodulating the GMSK signal so that the resulting accumulative phase can be determined to then enable the reconstruction of the data stream at the receiver. The carrier phase is constant over a frequency hop. The carrier phase of a GMSK modulated frequency hopped signal or an on-off GMSK modulated frequency hopped signal is estimated with the use of one or more synch words embedded in the data stream in each frequency hop.

The receiver determines the carrier phase of the hopped carrier modulo $2\pi$ of the GMSK frequency hopped signal having a synch word arbitrarily positioned within a frequency hop. The receiver demodulates first and second data portions of a frequency hop having a synch word placed between the first and second data portions within a frequency hop. In the case of three data portions, the receiver demodulates the first, second, and third data portions of a frequency hop having a first synch word position between the first and second data portions, and having a second synch word positioned between the second and third data portion all within a frequency hop. Hence, the receiver demodulates a plurality of data portions of a frequency hop signal having a synch word between each pair of consecutive portions of the plurality of data portions all within a frequency hop. In the case of two data portions, the receiver demodulates the first and second data portions by determining the unknown carrier phase of the carrier signal which has a known synch word and zeroing and guard bits arbitrarily placed between the first and second data portions with the zeroing and guard bits located contiguously prior to the synch word to generate a known data phase for determining the carrier phase for demodulating the second data portion and then demodulating the first data portion.

The transmitter inserts the zeroing channel bits and channel guard bits during transmission of each frequency hop, and the receiver detects the zeroing channel bits and channel guard bits for determining the carrier phase which is needed to demodulate each frequency hop. The carrier phase for coherent demodulation is unambiguously estimated before data demodulation. The zeroing bit and guard bits establish a known data phase at the beginning of each synch word so that the carrier phase can be determined for demodulating the data portions of the hop for reconstructing the estimate of the transmitted data at the receiver. The synch words are positioned arbitrarily within each hop. The zeroing channel bits and channel guard bits are located just prior to the synch word and are used to establish zero cumulative phase modulo $2\pi$ due to the first data position that is located in advance of the synch word so that the carrier phase can be determined by subtracting the synch word induced phase from the phase estimated at the end of the synch word. Once the carrier phase is known, the second data portion of the frequency hop can then be demodulated, and during a second demodulation pass, the first data portion can then be demodulated.

The frequency hop signal S(t) will arrive at the receiver with an unknown carrier phase $\theta_C$ at the receiver. After the carrier phase is determined, the receiver demodulates the received data portions for reconstructing the data stream. When the synch word is positioned between the first and second data portions within the frequency hop, zeroing symbols and guard symbols are inserted just prior to the synch word. The channel guard symbols and zeroing symbols along with the synch word, are used for obtaining the carrier phase of the frequency hopped signal. The synch words are placed within the hop time at boundaries between the two data portions with the zeroing and channel guard symbols immediately proceeding the synch word. Carrier phase is determined after the reception of the synch word, after which both the first and the second data portions can be coherently demodulated. After demodulating the second data portion, the first data portion which had been stored, would be coherently demodulated thus requiring a second demodulation pass on the received signal.

The zeroing bits are inserted just prior to the predetermined channel guard bits to force to zero the cumulative data phase in steady state with the phase of the carrier within the synch word duration zero radians modulo $2\pi$. With the phase at the start of the synch word forced to zero, the synch word provides an estimate of the carrier phase because the phase contribution is zero modulo $2\pi$ at the start of the synch word. This carrier phase determination is then used to demodulate the second data portion. Hence, the receiver must have memory to store the time line representation of the received signal during the first data portion so that the first data portion can be demodulated during the second demodulation pass using the estimated carrier phase determined from the synch word.

In processing the received signal, the receiver receives the transmitted signal comprising a first data portion communicating the first data bits and a second data portion communicating the second data bits. The receiver generates a local carrier reference. The receiver first coherently demodulates the second data portion of the transmitted signal by the local carrier reference for recovering the second data bits. The current carrier phase is equal to the accumulative data phase plus a carrier phase that is the phase difference between the received carrier signal and the local carrier reference when the accumulative data phase is zero. The current phase is equal to the known data phase at the end of synch bits for demodulating second data bits communicated within the second data portion. In order to provide for a second demodulation pass, the receiver stores a representation of the transmitted signal during the reception of the first data portion. After storage, the receiver coherently demodulates the representation of the portion of the first data portion for recovering the first data bits. Using the synch words, unambiguous carrier phase estimation for frequency hop GMSK signals is achieved using coherent demodulation. The carrier phase estimation is achieved by channel zeroing bits and channel guard bits positioned between each pair of a preceding data portion and a succeeding synch word, functioning as cumulative data phase zero forcing bits that force the accumulative data phase to zero at the end of the synch word for determining the carrier phase for subsequent data demodulation. As such, each synch word may be arbitrarily placed within a hop of the hopping signal having an unknown carrier phase for improved interference immunity.

The communication method also applies to the case where more than one synch word is placed in the hop. The phase is also known to be zero at the end of a set of channel guard bits prior to a respective synch word. The phase will be forced to zero at the end of each synch word regardless of all the prior channel bits from data bits, synch words, zeroing bits, and guard bits. Hence the carrier phase at the end of each synch word can again be estimated unambiguously. The present invention applies to communication signals using data filtering, such as Gaussian filtering, with continuous phase modulation with a synch word positioned between two consecutive data portions within the hop while offering immunity to interference present at the beginning of a hop. The method applies to all CPM signals. Those skilled in the art can make enhancements, improvements and modifications to the invention, and these enhancements, improvements and modifications may nonetheless fall within the spirit and scope of the following claims.

What is claimed is:

1. A method of communicating a transmitted signal communicating a sequence of bits within a frequency hop of a frequency hopping communication system, the method comprising the steps of, generating the sequence of bits comprising in order first data bits, zeroing bits, guard bits, synch bits, and second data bits, each of the bits has a bit time period T, formatting the sequence of bits into data pulses as channel symbols, filtering the channel symbols into respective filtered responses, the filtering is defined by a 3 dB bandwidth bit-time product BT so that the filtered responses extend over L bit time periods representing intersymbol interference memory of 1/BT bit periods, the number of guard bits is equal to L minus one, translating the filtered responses into respective data phase responses respectively representing the sequence of bits, the respective data phase responses are superimposed at any instance in time represented as an accumulative data phase covering superimposed contributions of the respective data phase responses for the respective prior L bits of the sequence of bits over the prior L bit periods, phase modulating a carrier signal by the accumulative data phase into a phase modulated signal, the zeroing bits serving to translate the accumulative data phase into a steady state data phase, the guard bits serving to translate the steady state data phase to a predetermined data phase at the end of the guard bits, the synch bits serving to translate the predetermined data phase to a known data phase at the end of the synch bits, phase modulating the carrier signal is defined by a modulation index h relating the respective data phase responses into a predetermined data phase amount, each bit serving to advance or retard the accumulative data phase of carrier signal by the predetermined data phase amount, the modulation index h is set so that the predetermined data phase amount equally divides into $2\pi$ radians, transmitting the phase modulated signal as the transmitted signal, receiving the transmitted signal comprising a first data portion communicating the first data bits and a second data portion communicating the second data bits, generating a local carrier reference, and demodulating coherently the second data portion of the transmitted signal by the local carrier reference for recovery of the second data bits, the phase modulated transmitted carrier signal when received is a received carrier signal that establishes a current phase between the received carrier signal and the local carrier reference, the current phase is equal to the accumulative data phase plus a carrier phase that is the phase difference between the received carrier signal and the local carrier reference when the accumulative data phase is zero, the current phase is equal to the known data phase at the end of synch bits for demodulating the second data bits communicated within the second data portion.

2. The method of claim 1 further comprising the steps of, storing a representation of the transmitted signal during the reception of the first data portion, and demodulating coherently the representation of the portion of the first data portion for recovery of the first data bits.

3. The method of claim 1 wherein the translating step is an integrating step wherein the filtered responses are integrated over time with each of the filtered responses integrated into respective phase responses that are accumulated over time, each of the respective phase responses advances or retards the accumulated data phase by the predetermined data phase amount.

4. The method of claim 1 wherein, the modulation index h is equal to ½, the predetermined data phase amount is $+/-\pi/2$ radians, and the predetermined data phase is zero.

5. The method of claim 4 wherein, the filtering step is a Gaussian filtering step, the formatting step is an NRZ formatting step, and L is between 2 and 8.

6. The method of claim 4 wherein, the zeroing bits are formatted as binary bits each formatted into one value form the set of positive and negative values respectively representing one and zero binary bits.

7. The method of claim 6 wherein, the filtering step is a Gaussian filtering step, the formatting step is an On-Off formatting step, and L is between 2 and 8.

8. The method of claim 1 wherein, the modulation index h is equal to ½, the predetermined data phase amount is $+/-\pi$ radians, and the predetermined data phase is zero.

9. The method of claim 1 wherein, the zeroing bits are formatted as two tertiary bits each formatted into one value from the set positive, negative, or zero values respectively representing one, zero, and true zero tertiary bits, the true zero tertiary bits serving to provide no respective filtered response and no advancement or retardation of the accumulative data phase.

10. A method of communicating a transmitted signal communicating a sequence of bits within a frequency hop of a frequency hopping communication system, the method comprising the steps of, generating the sequence of bits comprising in order first data bits, zeroing bits, guard bits, and synch bits, each of the bits has a bit time period T, formatting the sequence of bits into data pulses as channel symbols, filtering the channel symbols into respective filtered responses, the filtering is defined by a 3 dB bandwidth bit-time product BT so that the filtered responses extend over L bit time periods representing intersymbol interference memory of 1/BT bit periods, the number of guard bits is equal to L minus one, translating the filtered responses into respective data phase responses respectively representing the sequence of bits, the respective data phase responses are superimposed at any instance in time represented as an accumulative data phase covering superimposed contributions of the respective data phase responses for the respective prior L bits of the sequence of bits over the prior L bit periods, phase modulating a carrier signal by the accumulative data phase into a phase modulated signal, the zeroing bits serving to translate the accumulative data phase into a steady state data phase, the guard bits serving to translate the steady state data phase to a predetermined data phase at the end of the guard bits, the synch bits serving to translate the predetermined data phase to a known data phase at the end of the synch bits, phase modulating the carrier signal is defined by a-modulation index h relating the respective data phase responses into a predetermined data phase amount, each bit serving to advance or retard the accumulative data phase of the carrier signal by the predetermined data phase amount, the modulation index h is set so that the predetermined date phase amount equally divides into $2\pi$ radians, transmitting the phase modulated signal as the transmitted signal, receiving the transmitted signal comprising a first data portion communicating the first data bits, storing a representation of the transmitted signal during the reception of the first data portion, generating a local carrier reference, demodulating coherently the transmitted signal by the local carrier reference for acquiring the known data phase, the phase modulated carrier signal when received is a received carrier signal that establishes a current phase between the received carrier signal and the local carrier reference, the current phase is equal to the accumulative data phase plus a carrier phase that is the phase difference between the received carrier signal and the local carrier reference when the accumulative data phase is zero, the current phase is equal to the known data phase at the end of synch bits, and demodulating coherently the representation of the first data portion for recovery of the first data bits.

11. A method of communicating a transmitted signal communicating a sequence of bits within a frequency hop of a frequency hopping communication system, the method comprising the steps of, generating the sequence of bits comprising in order first data bits, zeroing bits, guard bits, synch bits, and second data bits, each of the bits has a bit time period T, formatting the sequence of bits into data pulses as channel symbols, filtering the channel symbols into respective filtered responses, the filtering is defined by a 3 dB bandwidth bit-time product BT so that the filtered responses extend over L bit time periods representing intersymbol interference memory of 1/BT bit periods, the number of guard bits is equal to L minus one, integrating the filtered responses into respective data phase responses respectively representing the sequence of bits, the respective data phase responses are superimposed at any instance in time represented as an accumulative data phase covering superimposed contributions of the respective data phase responses for the respective prior L bits of the sequence of bits over the prior L bit periods, phase modulating a carrier signal by the accumulative data phase into a phase modulated signal, the zeroing bits serving to translate the accumulative data phase into a steady state data phase, the guard bits serving to translate the steady state data phase to a predetermined data phase at the end of the guard bits, the synch bits serving to translate the predetermined data phase to a known data phase at the end of the synch bits, phase modulating the carrier signal is defined by a modulation index h relating the respective data phase responses into a predetermined data phase amount, each bit serving to advance or retard the accumulative data phase of the carrier signal by the predetermined data phase amount, the modulation index h is set so that the predetermined data phase amount equally divides into $2\pi$ radians, transmitting the phase modulated signal as the transmitted signal, receiving the transmitted signal comprising a first data portion communicating the first data bits and a second data portion communicating the second data bits, generating a local carrier reference, storing a representation of the transmitted signal during the reception of the first data portion, demodulating coherently the second data portion of the transmitted signal by the local carrier reference for recovery of the second data bits, the phase modulated carrier signal when received is a received carrier signal that establishes a current phase between the received carrier signal and the local carrier reference, the current phase is equal to the accumulative data phase plus a carrier phase that is the phase difference between the received carrier signal and the local carrier reference when the accumulative data phase is zero, the current phase is equal to the known data phase at the end of synch bits for demodulating the second data bits communicated within the second data portion, and demodulating coherently the representation of the portion of the first data portion for recovery of the first data bits.

12. The method of claim 11 wherein, the predetermined data phase is zero, the filtering step is a Gaussian filtering step, the formatting step is an NRZ formatting step, and the zeroing bits are formatted as binary bits each formatted into one value form the set of positive and negative values respectively representing one and zero binary bits.

13. The method of claim 11 wherein, the predetermined data phase is zero, the filtering step is a Gaussian filtering step, the formatting step is an On-Off formatting step, and the zeroing bits are formatted as two tertiary bits each formatted into one value from the set positive, negative or zero values respectively representing one, zero and true zero tertiary bits, the true zero tertiary bits serving to provide no respective filtered response and no advancement or retardation of the accumulative data phase.

* * * * *